United States Patent
Ahn et al.

(10) Patent No.: US 10,542,492 B2
(45) Date of Patent: Jan. 21, 2020

(54) METHOD FOR DRX IN UNLICENSED BAND, AND DEVICE USING SAME

(71) Applicant: LG ELECTRONICS INC., Seoul (KR)

(72) Inventors: Joonkui Ahn, Seoul (KR); Kijun Kim, Seoul (KR); Hanbyul Seo, Seoul (KR); Jonghyun Park, Seoul (KR); Hanjun Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/761,295

(22) PCT Filed: Sep. 23, 2016

(86) PCT No.: PCT/KR2016/010627
§ 371 (c)(1),
(2) Date: Mar. 19, 2018

(87) PCT Pub. No.: WO2017/052252
PCT Pub. Date: Mar. 30, 2017

(65) Prior Publication Data
US 2018/0270757 A1  Sep. 20, 2018

Related U.S. Application Data

(60) Provisional application No. 62/222,761, filed on Sep. 23, 2015, provisional application No. 62/222,763, (Continued)

(51) Int. Cl.
*H04W 52/02* (2009.01)
*H04W 16/14* (2009.01)
(Continued)

(52) U.S. Cl.
CPC ....... *H04W 52/0225* (2013.01); *H04W 16/14* (2013.01); *H04W 56/0005* (2013.01); *H04W 72/042* (2013.01)

(58) Field of Classification Search
CPC ........................... H04W 16/14; H04W 72/042
See application file for complete search history.

(56) References Cited

U.S. PATENT DOCUMENTS

| | | |
|---|---|---|
| 2013/0088983 A1 | 4/2013 | Pragada et al. |
| 2015/0049741 A1 | 2/2015 | Chen et al. |
| (Continued) | | |

OTHER PUBLICATIONS

Panasonic, "AGC and time/frequency synchronization for transmission burst", R1-154020, 3GPP TSG RAN WG1 Meeting #82, Beijing, China, Aug. 24-28, 2015, 5 pgs.

(Continued)

*Primary Examiner* — Shukri Taha
(74) *Attorney, Agent, or Firm* — Birch, Stewart, Kolasch & Birch, LLP (57) ABSTRACT

Provided are a method for discontinuous reception (DRX) in an unlicensed band, and a device using the same. The device is converted from a sleep state to an active state, and attempts downlink synchronization during a synchronization period. If the device does not obtain the downlink synchronization during the synchronization period, downlink data is received in the unlicensed band on the assumption that the modulation order of the downlink data scheduled in the active state is not greater than a specific value.

6 Claims, 7 Drawing Sheets

Related U.S. Application Data filed on Sep. 23, 2015, provisional application No. 62/238,117, filed on Oct. 7, 2015, provisional application No. 62/238,670, filed on Oct. 7, 2015, provisional application No. 62/250,492, filed on Nov. 3, 2015, provisional application No. 62/295,127, filed on Feb. 14, 2016.

(51) Int. Cl.
*H04W 56/00* (2009.01)
*H04W 72/04* (2009.01)

(56) References Cited

U.S. PATENT DOCUMENTS

| | | | |
|---|---|---|---|
| 2015/0092768 A1* | 4/2015 | Ng | H04W 48/16 370/350 |
| 2016/0037550 A1* | 2/2016 | Barabell | H04B 17/318 455/450 |
| 2018/0255518 A1* | 9/2018 | Nammi | H04W 16/14 |

OTHER PUBLICATIONS

Qualcomm Incorporated, "Considerations on DRX procedure for LAA-LTE", R2-153860, 3GPP TSG-RAN WG2 Meeting #91, Beijing, China, Aug. 24-28, 2015, 4 pgs.
Samsung, "LAA synchronization", R1-154770, 3GPP TSG RAN WG1 #82, Beijing, China, Aug. 24-28, 2015, 5 pgs.

\* cited by examiner

Special subframe, configuration 1, 2, 6 or 7

Special subframe, configuration 3, 4, 8 or 9

All other downlink subframe

METHOD FOR DRX IN UNLICENSED BAND, AND DEVICE USING SAME

CROSS REFERENCE TO RELATED APPLICATIONS

This application is the National Phase of PCT International Application No. PCT/KR2016/010627, filed on Sep. 23, 2016, which claims priority under 35 U.S.C. 119(e) to U.S. Provisional Application No. 62/222,761, filed on Sep. 23, 2015, U.S. Provisional Application No. 62/222,763, filed on Sep. 23, 2015, U.S. Provisional Application No. 62/238,117, filed on Oct. 7, 2015, U.S. Provisional Application No. 62/238,670, filed on Oct. 7, 2015, U.S. Provisional Application No. 62/250,492, filed on Nov. 3, 2015, and to U.S. Provisional Application No. 62/295,127, filed on Feb. 14, 2016, all of which are hereby expressly incorporated by reference into the present application.

BACKGROUND OF THE INVENTION

Field of the Invention

The present invention relates to wireless communication, and more particularly, to a method for discontinuous reception (DRX) in an unlicensed band and a device using the same.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for discontinuous reception (DRX) in an unlicensed band and a device using the method.

In an aspect, a method for discontinuous reception (DRX) in an unlicensed band is provided. The method includes attempting, by a wireless device, to acquire a downlink synchronization during a synchronization period after transitioning from a sleep state to an active state, and, if the downlink synchronization is not acquired during the synchronization period, receiving, by the wireless device, downlink data in the unlicensed band assuming that a modulation order of the downlink data scheduled in the active state is less than or equal to a specific value.

In another aspect, a device for performing discontinuous reception (DRX) in an unlicensed band includes a transceiver configured to transmit and receive a radio signal and a processor coupled to the transceiver. The processor is configured to attempt to acquire a downlink synchronization during a synchronization period after transitioning from a sleep state to an active state, and, if the downlink synchronization is not acquired during the synchronization period, receive downlink data in the unlicensed band assuming that a modulation order of the downlink data scheduled in the active state is less than or equal to a specific value.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
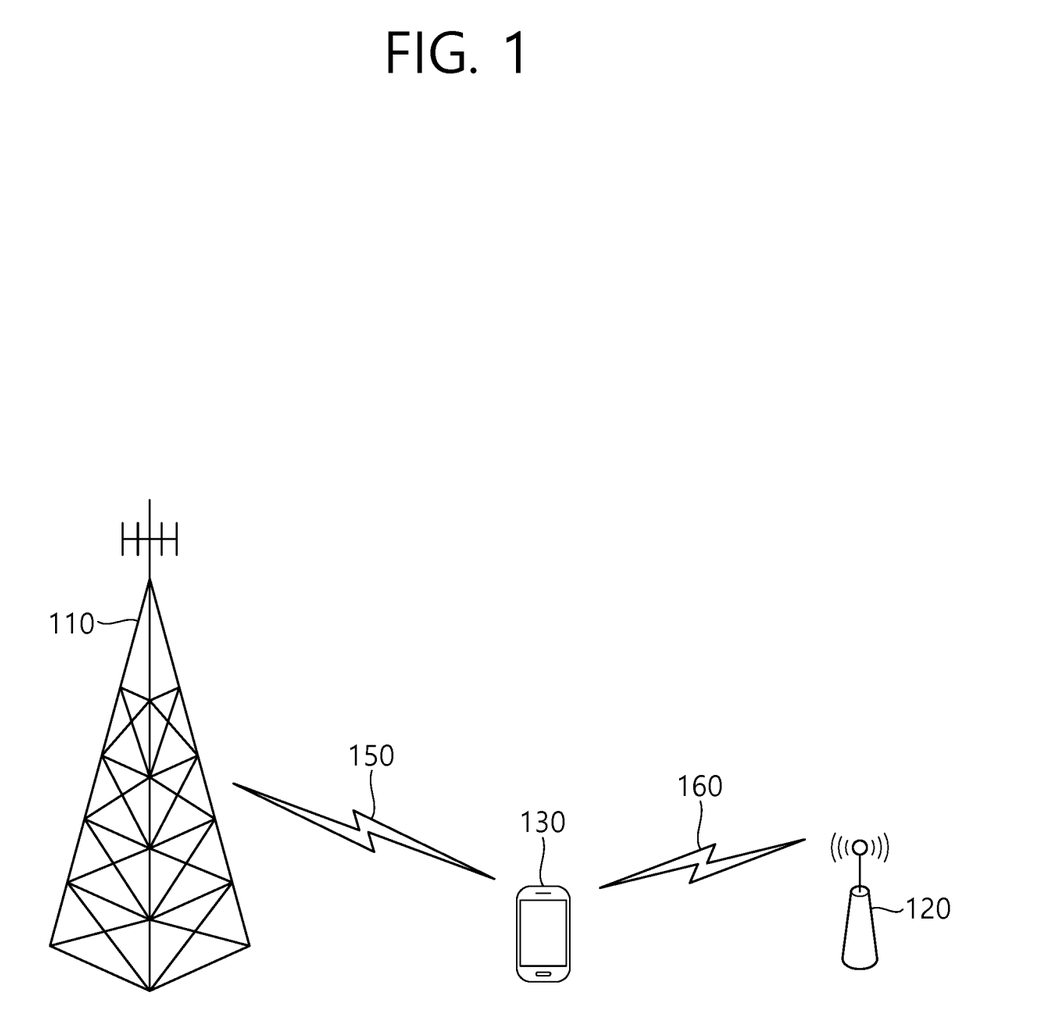
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell operating in an unlicensed band is referred to as 'unlicensed cell' and a cell operating in a licensed band is referred to as 'licensed cell'. For clarity, it is assumed that a licensed cell is a primary cell and an unlicensed cell is a secondary cell.

Figure 2:
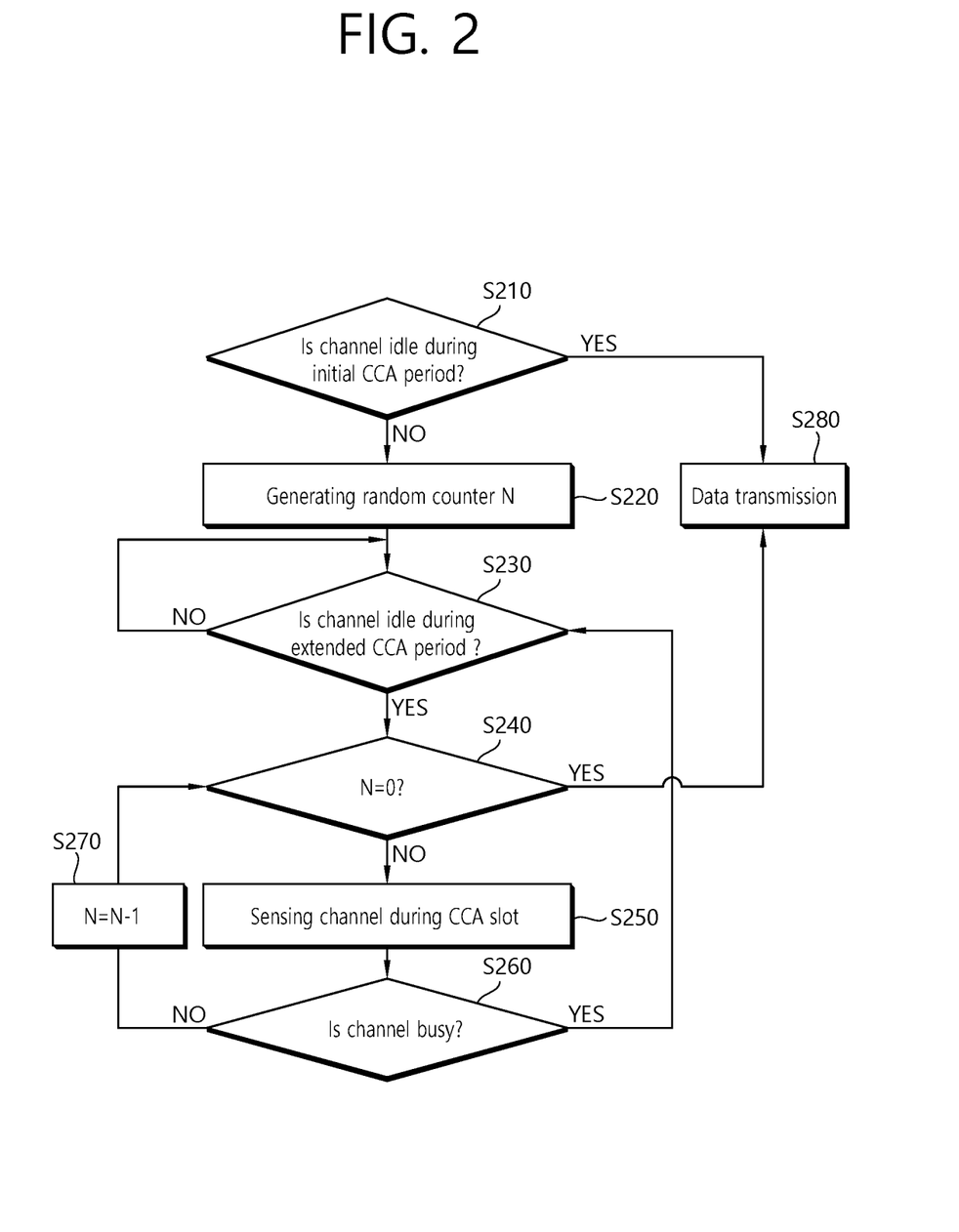
FIG. 2 shows an example in which the CCA is performed.

FIG. 2 shows an example in which the CCA is performed.

If data transfer is required, a transmission node determines whether the channel is idle during the initial CCA interval (for example, 34 μs) (S210). If the channel is idle, the transmission node transmits data (S280).

When the channel is busy, the transmission node generates a random counter N (S220). The random counter may be selected randomly from 0 to q. The range of N determined by q is called the contention window. The size of the contention window may be predefined. Depending on the type of data to send, the size of the contention window may vary.

The transmission node determines whether the channel is idle during the extended CCA interval (e.g., 34 μs) (S230). If the channel is idle, backoff is performed on a CCA slot (e.g., 9 μs or 10 μs) basis until N becomes zero (S240-S270). The channel is sensed during the CCA slot (S250). If the channel is busy, it is checked again whether the channel is idle during the extended CCA interval (S260). If the channel is idle, N is decremented by 1 (S270). When N becomes zero (S240), data is transmitted (S280).

Figure 3:
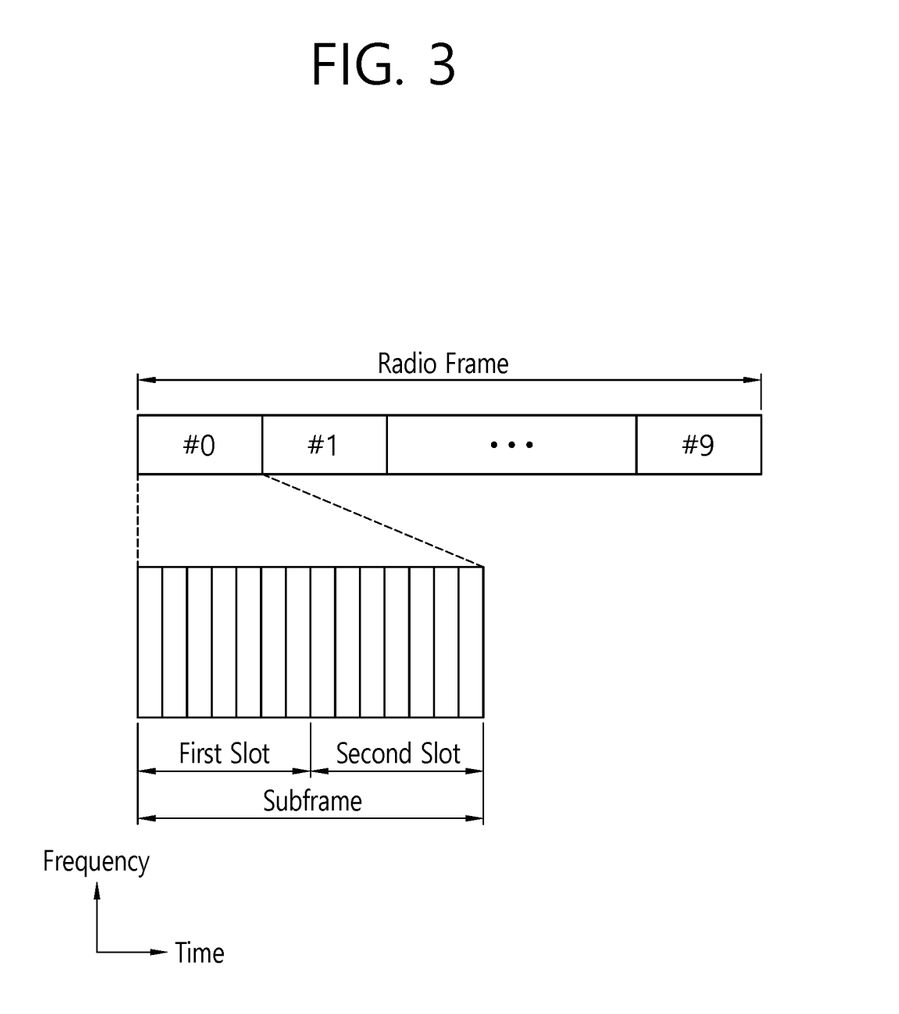
FIG. 3 shows a subframe structure in 3GPP LTE.

FIG. 3 shows a subframe structure in 3GPP LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 14 OFDM symbols for example, the number of OFDM symbols included in one slot may vary depending on a length of a cyclic prefix (CP). According to 3GPP LTE-A, in case of a normal CP, one slot includes 14 OFDM symbols, and in case of an extended CP, one slot includes 12 OFDM symbols.

A resource block (RB) is a resource allocation unit and includes a plurality of subcarriers in one slot. For example, if one slot includes 7 OFDM symbols in a time domain and the RB includes 12 subcarriers in a frequency domain, one RB may include 7×12 resource elements (REs).

A physical channel of 3GPP LTE-A may be classified into a downlink (DL) physical channel and an uplink (UL) physical channel. The DL physical channel includes a physical downlink control channel (PDCCH), a physical control format indicator channel (PCFICH), a physical hybrid-ARQ indicator channel (PHICH), and a physical downlink shared channel (PDSCH).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

One of the typical functionality required for the Licensed-Assisted Access using LTE (LAA) system may be radio resource management (RRM) measurement. In a small cell environment of legacy 3GPP LTE, a discovery reference signal (DRS) was used for RRM measurement. The base station configures a discovery measurement timing configuration (DMTC) of a certain period (for example, 6 ms) for the UE. The UE periodically attempts to detect DRS during the configured DMTC period and performs cell identification, RRM measurement, and the like.

Even if an unlicensed cell is activated, DL transmission is not always guaranteed due to the nature of the unlicensed band with CCA. Since CCA operation may be necessary for DRS transmission, DRS transmissions for RRM measurements may also be difficult to be guaranteed at all times.

DRS is a signal periodically transmitted for RRM measurement of the UE. The measurement cycle of DRS by UE is called DMTC. The DMTC may include one or more consecutive subframes. The base station may configure DMTC for each UE. For example, a 6 ms long DMTC may be configured at 40 ms intervals.

DRS may include a primary synchronization signal (PSS)/secondary synchronization signal (SSS) for cell ID detection and synchronization, and a cell specific reference signal (CRS)/channel state information-reference signal (CSI-RS).

In an unlicensed cell, at least one last OFDM symbol of the last subframe in which the DRS is transmitted may remain idle without DRS transmission for CCA operation to be performed for signal transmission in another cell.

The base station may perform, for transmission of DRS alone (referred to as DRS burst), CCA with smaller contention window than other DL data transmission. In the DMTC period, the DRS may be multiplexed with the data burst and transmitted in the same subframe as the data burst. In this case, the CCA operation defined for data burst transmission may be applied.

Figure 4:
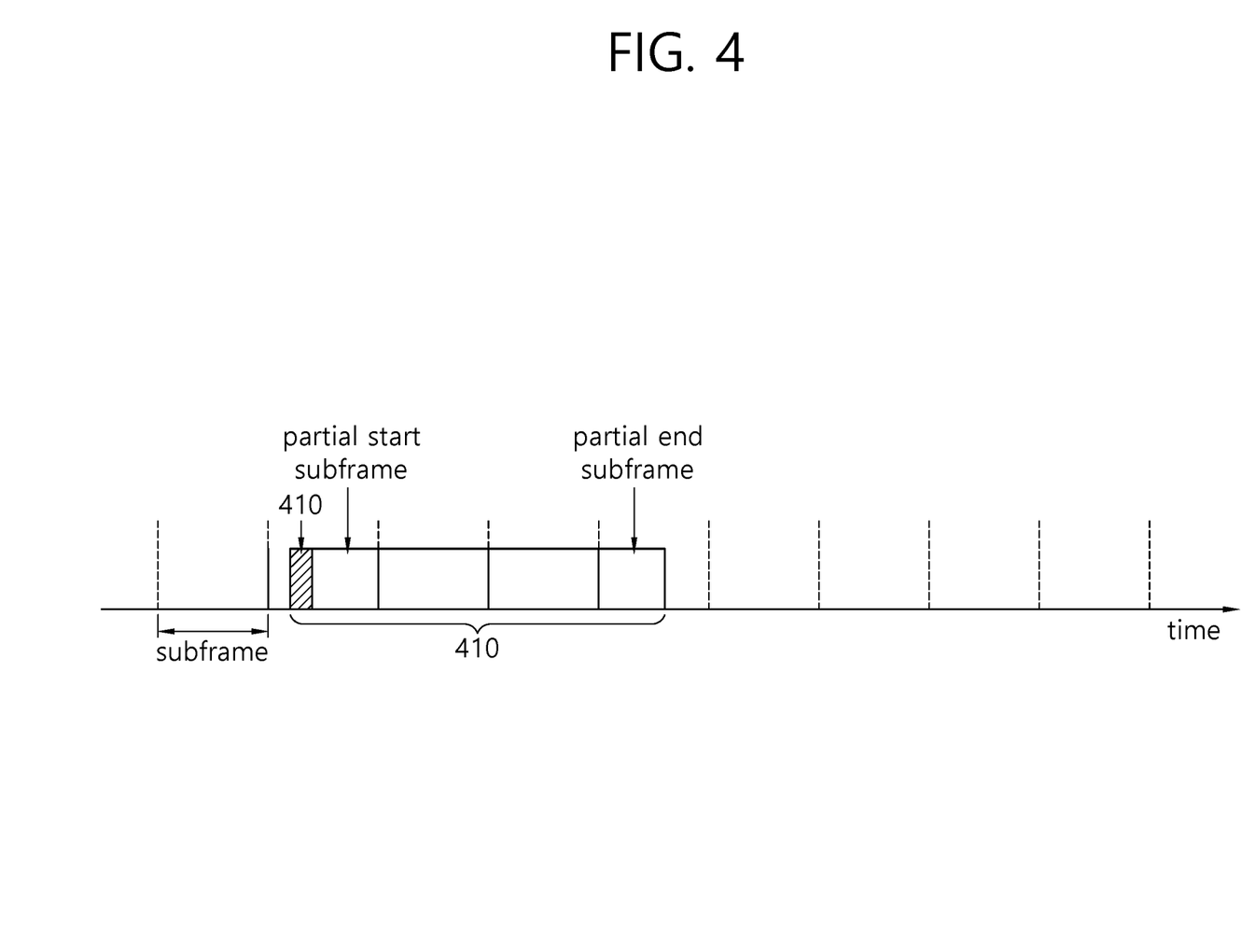
FIG. 4 shows an example of burst transmission.

FIG. 4 shows an example of burst transmission.

A burst 410 is a packet transmitted after the completion of the CCA. The burst may be transmitted in one or more consecutive subframes. At the start of the burst 410, an initial signal 411 may be transmitted for channel occupancy, burst start detection, and time/frequency synchronization. The initial signal 411 is also referred to as a reservation signal or a preamble.

In legacy 3GPP LTE, the start of DL/UL data transmission is limited to subframe boundaries. However, when in the unlicensed band, the data transmission start timing is limited to an OFDM symbol boundary or a subframe boundary, another transmission node starts signal transmission between any time when the transmission node of interest confirmed the CCA and the start time of data transmission, the node of interest may fail to acquire the channel. To prevent this, instead of starting DL transmission at the subframe boundary, the node of interest may begin DL transmission immediately after confirming the CCA or within a certain time thereafter. When the burst transmission starts in the middle of a subframe, it is called a partial start subframe. When the burst transmission ends in the middle of a subframe, it is called a partial end subframe. In the partial end subframe, the CCA is started after the burst transmission is completed, and, then, the transmission may start in the immediately subsequent subframe.

Transmission of DRS Burst

Now, the transmission schemes of DRS burst and data burst are proposed as follows.

In a first embodiment, the number of transmissions of the DRS burst during the DMTC in the unlicensed band may be limited. If the CCA scheme of DRS burst is advantageous in terms of transmission opportunity compared to that of data burst, transmitting DRS bursts multiple times within a DMTC by one base station may lead to inequality in channel access opportunities for other wireless nodes. Therefore, the number of the DRS burst transmissions by one base station within the DMTC may be limited to M times or less. M may be 1 or 2.

When the DRS is multiplexed with the data burst, the above limitation may not apply. Assuming that PSS/SSS/CRS is transmitted in subframe #0 and subframe #5 of a radio frame, the above limitation may not be applied to DRS transmitted using subframes #0/5. Also, when the DL data is scheduled in the subframes 0 and 5 in the DMTC for the UE, the REs that may be used by the DRS (CRS, PSS/SSS, CSI-RS, etc.) are all excluded, and the corresponding DL data may be received. To exclude the CSI-RS used for the DRS, it is assumed that the configured ZP (zero-power)-CSI-RS is valid in all the subframes #0/5 in the DMTC.

It is assumed that DMTC configured on the first serving carrier includes K subframes, and all K subframes are candidate subframes that may be used to transmit the DRS of one subframe length. If the UE using the second serving carrier detects the DRS transmission in the DMTC period of the first serving carrier via frequency switching, the beginning of the first subframe and the end of the last subframe among the K subframes may not be used for DRS detection due to the frequency switching. To prevent this, the DMTC length may be configured to be shorter than the measurement gap for inter-frequency measurement. For example, if the measurement gap includes 6 subframes, the DMTC may include 5 or 4 subframes. Alternatively, the candidate subframe in which the DRS may be transmitted may be smaller than the DMTC length. For example, if the DMTC includes 6 subframes, the candidate subframe may contain 5 or 4 subframes.

In a second embodiment, in a partial subframe, the DRS may be restricted from being multiplexed with the data burst. UE may assume that a subframe (referred to as a DRS subframe) for DRS transmission may not be a partial subframe.

Assuming that all of the PSS/SSS/CRS/CSI-RS are required in order for the PSS/SSS/CRS/CSI-RS as the DRS to satisfy the DL synchronization/measurement performance, not transmitting some of the DRS symbols may degrade performance. Therefore, the DRS may be prevented from being multiplexed and transmitted in the partial subframe of the data burst. When a PDSCH is scheduled in a subframe in which DRS is detected, the UE may assume that the corresponding PDSCH has been transmitted using a full subframe instead of a partial subframe. When the PDSCH is scheduled in the partial subframe, the UE may assume that the DRS is not multiplexed in the corresponding subframe.

In a third embodiment, when the DRS is transmitted in a plurality of subframes, the DRS may be multiplexed with the data burst only in a pre-defined subframe.

If the DRS may be multiplexed in any subframe in the data burst, the UE may not know a subframe in which data may be received using RE except for RE used for DRS transmission. In particular, if the DRS is transmitted on a plurality of consecutive subframes, the combination of subframes becomes complicated since the UE must receive the data except for the DRS from the subframe in which the DRS and the data burst are multiplexed with each other. Therefore, the data burst and DRS may be multiplexed with each other only in a pre-defined subframe within the DMTC. If the DRS includes PSS/SSS, the pre-defined subframe may be a subframe #0 or 5. The DRS may be multiplexed in a plurality of consecutive subframes equal to the DRS subframe length from the pre-defined subframe. The UE assumes that the DRS is always transmitted from the pre-defined subframe. The UE may receive the PDSCH using REs other than the RE used for the DRS transmission.

In a fourth embodiment, a DRS with CSI-RS (referred to as 'CSI-RS-DRS') may be multiplexed with a data burst in a pre-defined subframe. CRS is usually transmitted using all subframes in the data burst. Thus, if DRS primarily includes CRS, there is no additional overhead burden in multiplexing with the data burst. The DRS with CRS may be multiplexed in any subframe in the data burst. Since the CSI-RS is transmitted only in a subframe configured by RRC signaling, the overhead may be increased when the CSI-RS-DRS is multiplexed with the data burst. Therefore, CSI-RS-DRS may be multiplexed only in a predetermined subframe. The UE assumes that CSI-RS-DRS is always transmitted in a predetermined subframe, and, then, the UE may receive PDSCH using REs other than RE used for DRS transmission. The predetermined subframe may include subframes #0 and/or 5 in the DMTC.

In a fifth embodiment, CSI-RSs for DRS transmitted in a plurality of subframes may have the same structure. Different base stations may transmit DRS on different subframes based on CCA success or failure in the DMTC. In the case where the DRS is transmitted in a plurality of consecutive subframes and each subframe includes a non-zero-power/zero-power CSI-RS, and when the DRS transmission start subframes are different between the base stations, the orthogonality of the DRS may not be guaranteed. For example, assume that DRS is transmitted in two subframes. First base station transmits non-zero-power CSI-RS using CSI-RS ports #15 and 16 in each subframe, and the second base station may transmit the zero-power CSI-RS using CSI-RS ports #15 and 16 in each subframe. If the second base station starts the DRS transmission later by one subframe than the first base station, the non-zero-power CSI-RS port #16 of the first base station and the zero-power CSI-RS port #15 of the second base station are transmitted in the same subframe, such that orthogonality may not be guaranteed. Therefore, when CSI-RS-DRS is transmitted in a plurality of subframes, the same CSI-RS port and zero-power/non-zero-power CSI-RS may be used over the plurality of subframes. For example, assume that the first base station transmits non-zero-power CSI-RS using CSI-RS port #15 for each subframe, and that the second base station transmits zero-power CSI-RS using CSI-RS port #15 for each subframe. Even if the second base station starts a DRS transmission later by one subframe than the first base station, the non-zero-power CSI-RS port #15 of the first base station and the zero-power CSI-RS port #15 of the second base station are transmitted in the same subframe, such that orthogonality may be ensured. The UE assumes that the CSI-RSs configured for DRS in all the subframes in the DMTC have the same structure. Thus, the UE may receive the PDSCH using REs other than the RE used for the CSI-RS-DRS transmission.

In a fifth embodiment, it is necessary to consider the multiplexing of the DRS and the UE specific RS (URS).

Figure 5:
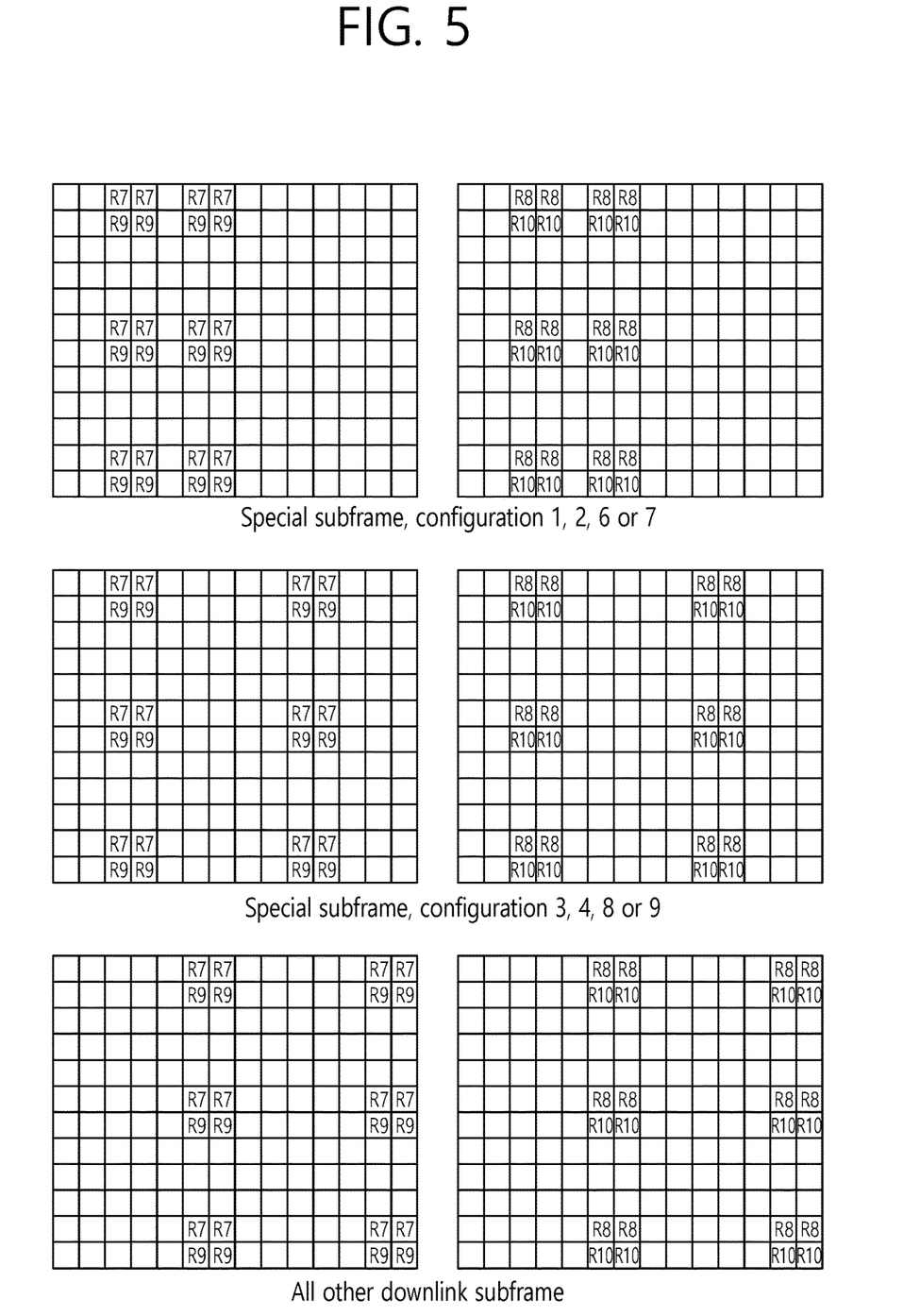
FIG. 5 shows an example in which a URS is deployed in 3GPP LTE.

FIG. 5 shows an example in which a URS is deployed in 3GPP LTE. R7 is the URS for antenna port 7, R8 is the URS for antenna port 8, R9 is the URS for antenna port 9, R10 is the URS for the antenna port 10.

For a UE configured to receive a PDSCH based on URS, a URS having the structure as shown in FIG. 5 is transmitted to the UE using the RB via which the PDSCH is transmitted. For a general subframe that is not a special subframe used in TDD (time duplex division), the URS is transmitted to the UE in the last two OFDM symbols of each subframe.

If one or more of the OFDM symbols of the last subframe in which the DRS burst is transmitted is empty, it is impossible to multiplex with the URS in the corresponding subframe. Therefore, the UE may assume that the PDSCH based on the URS is not scheduled in all the subframes in the DMTC, subframe in which the DRS burst and the PDSCH may be multiplexed with each other, or the (last) subframe in which the DRS burst is detected. Alternatively, when the URS-based PDSCH is scheduled in all the subframes in the DMTC, subframe in which the DRS burst and the PDSCH may be multiplexed with each other, or the (last) subframe in which the DRS burst is detected, the UE may assume that the URS is transmitted in the corresponding subframe using a URS pattern that does not use the last OFDM symbol, such as URS applied to a special subframe.

The UE may assume that the PDSCH is transmitted excluding the number of the last OFDM symbols as emptied in the DRS burst, in all the subframes in the DMTC, subframe in which the DRS burst and the PDSCH may be multiplexed with each other, or the (last) subframe in which the DRS burst is detected. The DL grant scheduling the PDSCH may include information indicating whether or not the number of the last OFDM symbols to be emptied as in the DRS burst is vacated in the corresponding subframe.

On the contrary, the UE may assume that the PDSCH is transmitted including up to the last OFDM symbol even when the PDSCH is multiplexed in the DRS burst.

In a sixth embodiment, the density of CRS or CSI-RS used as DRS may be increased to perform DL synchronization/measurement using a short DRS period.

In a subframe in a DRS period, a CRS may be transmitted using REs occupied by a greater number of CRS antenna ports than a CRS antenna port used in a general subframe. For example, if the base station only supports antenna port 0, the base station may transmit additional CRSs using REs defined for CRS transmission for antenna port 1 in the DRS subframe. The CRS may actually be transmitted using antenna port 0. In the DRS subframe, a base station may always transmit CRS using REs for two or more antenna ports.

The base station may always transmit the CSI-RS using an RE defined for one or more CSI-RS antenna ports. For example, in the DRS subframe, the base station may always transmit CSI-RS using two or more CSI-RS antenna ports. The corresponding CSI-RS may actually be transmitted using the same antenna port.

DL Synchronization

The UE may operate in discontinuous reception (DRX) mode. In DRX mode, the UE transitions between the active state and the sleep state. In the active state, the UE may normally perform data transmission and reception. The UE may monitor the PDCCH in the active state. In the sleep state, the UE may perform only minimal operations such as measurement to reduce battery consumption.

The UE may obtain fine synchronization for data demodulation by using the CRS included in the data burst or the initial signal of the data burst. In addition, the UE may use the DRS to obtain course synchronization. The signal that the UE receives for DL synchronization is referred to as a synchronization signal.

In the DRX mode, if the UE transitions from the sleep state to the active state and thereafter does not receive a sufficient amount of synchronization signals, DL synchronization performance for DL data reception may be degraded.

Figure 6:
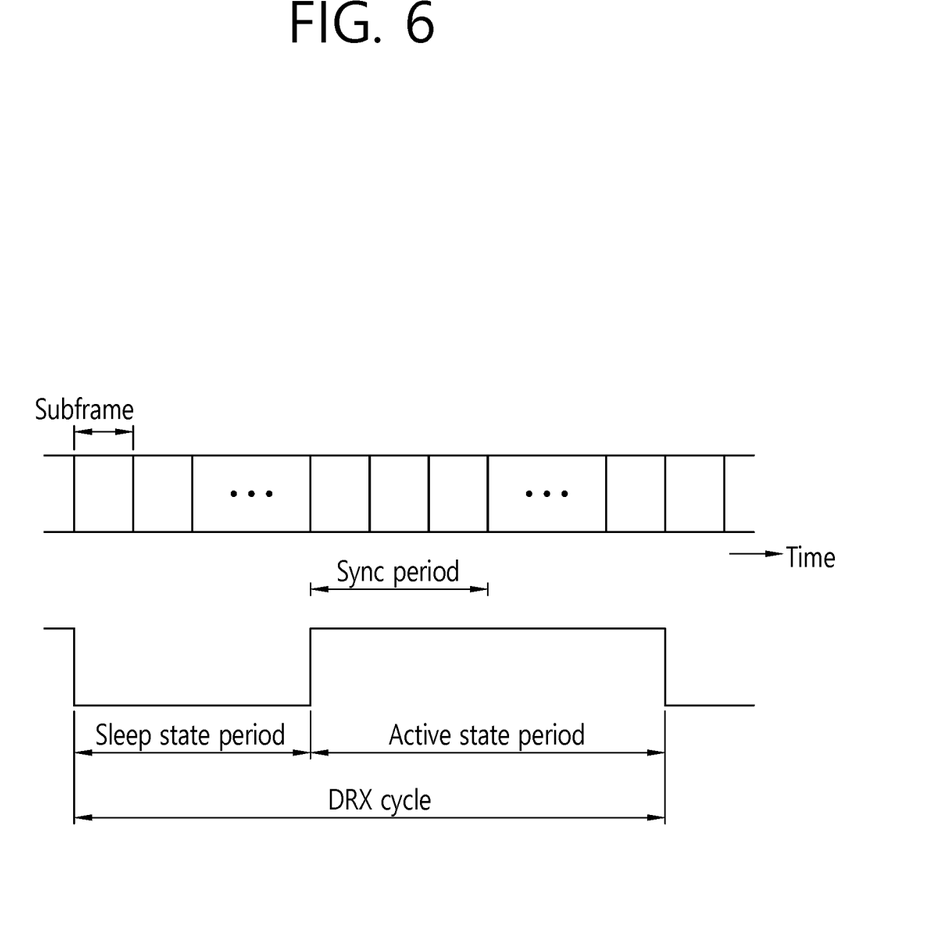
FIG. 6 illustrates a DRX operation according to an embodiment of the present invention.

FIG. 6 illustrates a DRX operation according to one embodiment of the present invention.

The sleep state period is a period during which the UE operates in a sleep state. The active state period is the period during which the UE operates in the active state. The DRX cycle is a cycle that includes a sleep state period and an active state period.

After switching from the sleep state to the active state, the UE attempts to acquire the DL synchronization during the synchronization period. The synchronization period may include zero or more subframes.

Upon waking up from the sleep state, the UE may receive the synchronization signal and attempt DL synchronization during the synchronization period. If the UE fails to receive a synchronization signal during the synchronization period or fails to receive a synchronization signal of a predetermined amount or more, the UE may not be able to acquire DL synchronization sufficiently.

If the UE does not acquire the DL synchronization during the synchronization period, the UE may assume that the UE does not need to perform a DL reception operation (e.g., PDCCH monitoring, CSI measurement, etc.).

If the UE does not acquire the DL synchronization during the synchronization period, the UE may assume that the PDSCH to which the modulation order equal to or above the specific modulation order is applied is not scheduled. For example, the UE may assume that a PDSCH to which a modulation scheme with a modulation order of 4 or higher (e.g., 16-QAM, 64-QAM, 256-QAM) is applied is not scheduled. The UE may assume that a low PDSCH reception performance requirement is applied. The UE may attempt PDSCH reception when the modulation order indicated by the DL grant on the received PDCCH is less than or equal to the specific value. If the modulation order indicated by the DL grant on the received PDCCH is greater than the specific value, the UE may discard the DL grant and discard the PDSCH reception.

In the active state, the UE monitors the PDCCH. The UE then receives the DL data on the PDSCH based on the received DCI. If the UE does not acquire the DL synchronization during the synchronization period, the UE may assume that a modulation scheme with a modulation order of less than or equal to a specific value (e.g., 3) is applied to the DL data scheduled by the DCI. If the corresponding DCI indicates a modulation order that exceeds the specific value, the UE may abandon the reception of the corresponding DL data.

A synchronization timer may be applied so that the UE obtains DL synchronization in the active state. If the DL synchronization is not confirmed by UE after the UE switches to the active state, the UE initiates the synchronization timer. During the operation of the synchronization timer, the UE receives the synchronization signal and attempts to acquire the DL synchronization. If the UE has acquired the DL synchronization, the synchronization timer is interrupted. If the UE does not acquire the DL synchronization until the synchronization timer expires, the UE may perform an operation equivaled to an operation taken when UE does not acquire the DL synchronization during the synchronization period.

The UE may perform DL synchronization by receiving the DRS in the DMTC in a sleep state period. The UE may perform DL synchronization by receiving the DRS in the DMTC from a certain time before entering the active state.

The base station may not schedule the PDSCH or the like to the UE using a data burst that overlaps with the sleep state period.

The UE may attempt to detect the initial signal from a certain time before entering the active state.

A subframe including at least four CRS transmission OFDM symbols is referred to as a full CRS subframe. It is assumed that a multicast-broadcast single-frequency network (MBSFN) subframe includes at least one CRS transmission OFDM symbol. If a burst is transmitted in one or more MBSFN subframes, the synchronization performance may be degraded in the burst. Therefore, it may be assumed that there are at least R full CRS subframes at the beginning of the burst (N>=1). The burst overlapping the sleep state period may be assumed to have R full CRS subframes from the beginning where the burst do not overlap with the sleep state period. When the burst is transmitted in Q subframes and 0 or more partial subframes, the UE may assume that data is not transmitted in the MBSFN subframe. Even if the burst is transmitted in a subframe configured as an MBSFN subframe, the UE may assume that all of CRSs are transmitted in the non-MBSFN region in the corresponding subframe.

Radio Channel Measurement

An UE reports the channel quality indicator (CSI) of the measured DL channel to the base station using an RS such as CRS or CSI-RS. The UE performs reception signal measurement (S measure) and interference signal measurement (I measure) of the RS transmitted by the base station for CSI calculation. The UE must be able to determine the transmission time of the base station for this purpose. In particular, the I measure may be effective in predicting the interference to be experienced when receiving the DL data from the base station via the actual CCA to be measured for the time period for transmitting the signal by the base station.

In the following, the present disclosure proposes a specific scheme by which the UE determines whether signal transmission by a base station occurs using the BD (blind detection) and, accordingly, performs the CSI measurement.

Hereinafter, RS refers to resources used for S-measure and I-measure such as CRS, CSI-RS, CSI-IM and the like. In the following, it is assumed that the subframe includes 14 OFDM symbols. This is just an example.

In the first embodiment, the UE may measure the CSI based on an initial signal transmitted at the beginning of the burst. If an initial signal is detected in the corresponding subframe, the UE assumes that the base station transmits the signal in an OFDM symbol after the initial signal in the subframe. Then, the UE may measure the CSI based on the RS. For example, assume that the CRS may be transmitted in 1, 5, 8, and 12th OFDM symbols within one subframe. If the initial signal is detected immediately before the fifth OFDM symbol, the UE may assume that the CRS is transmitted in the 5th, 8th and 12th OFDM symbols.

If the length or the minimum length of the burst transmitted by the base station is predetermined or given by signaling, the UE assumes that the base station transmits a signal during the burst length after detecting the initial signal. Under this assumption, the UE may measure the CSI based on the RS.

In a second embodiment, the UE may measure the CSI based on the DRS in the DMTC. The base station may periodically transmit DRS within the DMTC. If the DRS is detected in a corresponding subframe, the UE assumes that CRS/CSI-RS/CSI-IM for CSI measurement is present in the subframe. Thus, the UE may measure CSI.

In a third embodiment, if the base station is likely to transmit a partial subframe, the UE performs the BD for the RS for each of RSs that may be included in the partial subframe. Thereby, the UE may determine the presence or absence of an OFDM symbol that may be used in the CSI measurement.

For example, suppose that a subframe transmission may start in the first and eighth OFDM symbols. If the CRS transmitted using the first OFDM symbol is detected, the UE assumes that the corresponding subframe is a general subframe. Accordingly, the UE may measure the CSI using the RS transmitted after the first OFDM symbol. If a CRS transmitted using the eighth OFDM symbol is detected, the UE may measure the CSI using the RS transmitted after the eighth OFDM symbol. Similarly, it is assumed that the subframe transmission may end in the 11th or 14th OFDM symbol. When the CRS transmitted using the 12th OFDM symbol is detected, the UE assumes that the subframe is transmitted including up to the 14th OFDM symbol. Thus, the UE may measure the CSI using RS transmitted including up to the 14th OFDM symbol. If a CRS transmitted using the eighth OFDM symbol is detected, the UE may measure the CSI using RS transmitted including up to the 11th OFDM symbol.

In order to reduce the complexity for determining absence or presence of RS transmission by the UE, the UE may always measure the CSI in a partial subframe. For example, if the base station may end transmission on the 11th OFDM symbol of a subframe, the UE should always measure the CSI only using the RS transmitted using the OFDM symbol before the 11th OFDM symbol.

In a fourth embodiment, the first to third embodiments may be applied to the S measure and I measure using CRS/CSI-RS/CSI-IM.

If the I measure may be performed on an OFDM symbol other than the OFDM symbol on which the RS for the S measure is transmitted, the UE may use, for the I measure, the detected DL signal period using the method of the first embodiment or the second embodiment. The UE may use only the first n OFDM symbols corresponding to the non-MBSFN region of the BSFN subframe (n=1 or 2 or 3) for the I measure.

In a fifth embodiment, the UE may measure CSI based on aperiodic CSI triggering information. The aperiodic CSI triggering information indicates that the base station is triggering a CSI report for one or more cells using the DCI on the PDCCH. When the CSI report is triggered, the UE may assume that a signal for CSI measurement has been transmitted in a subframe in which the PDCCH is received, or its associated subframe.

If the base station transmits RS only in cells that have succeeded in CCA among a plurality of cells triggering the CSI report, the UE may measure CSI in remaining cells as follows: When an aperiodic CSI report for one cell is triggered, the UE may assume that a signal for a CSI measurement has been transmitted in a subframe associated with DCI having triggering information of the cell. Otherwise, a BD for the RS is required. When an aperiodic CSI report for a plurality of cells is triggered, the UE may assume that a signal for a CSI measurement has been transmitted in the subframe associated with the DCI with triggering information of a specific cell. For the remaining cells, a BD for the RS is required. The DCI may contain information identifying a cell in which a signal for a CSI measurement may be supposed to be transmitted actually.

In a sixth embodiment, the base station may provide information about the length of the burst. The length of the burst may indicate the number of one or more consecutive subframes in which one or more PDSCHs are transmitted. The length of the burst may mean the number of subframes in which the UE attempts reception operations required for DL data reception, such as PDCCH reception, CSI measurement attempts, and so on.

The DCI on the PDCCH may include a transmit burst length indication (TBLI) indicating the length of the burst. When the UE detects an initial signal, UE may receive the burst based on the time of detection of the initial signal and the length of the burst learned using the TBLI. The TBLI may be included in the DCI that schedules the PDSCH/PUSCH for each UE. Alternatively, the TBLI may be included in a DCI that is commonly detected by a plurality of UEs.

TBLI may indicate the length of the remaining (minimum/maximum) bursts from the subframe in which the corresponding DCI was received. The UE may perform the reception operation of the burst from the subframe used for receiving the TBLI to the subframe as indicated by the TBLI.

TBLI may indicate whether the burst transmission is continued in the next subframe. When the UE uses the TBLI to know that the burst transmission is continued in the next subframe, the UE may perform a reception operation of the burst in at least the next subframe.

TBLI may indicate a specific state (for example, undefined or infinite or maximum burst length). This is because the specific base station may not be able to determine scheduling for a plurality of subframes in advance. When receiving the TBLI having the specific state, the UE may determine whether transmission of the burst is continued using the BD or the like. The UE assumes a maximum burst length from the time when the initial signal is detected or from the subframe used for receiving the TBLI. Then, the UE may perform a reception operation such as PDCCH detection or CSI measurement.

Even if the UE receives the TBLI, the TBLI may be difficult to be used in burst reception in the immediately following subframe, with considering the time required for decoding and the preparation time required for application thereof. In consideration of this, the TBLI may indicate the information on the burst length from the Y subframes (Y>=1) from the subframe used for receiving the TBLI. The UE may perform the reception operation using the corresponding information from the Y subframes from the subframe used for receiving the TBLI.

In a seventh embodiment, a method is required to determine if subframes belong to the same burst. If different operations are applied to the receptions by the UE on a burst basis, it should be determined whether the subframes used for receiving the PDSCH or other signals by UE belongs to the same burst, and it should be determined which burst the subframes belongs to. In a typical example, if the transmission power of the RS (especially the CRS or CSI-RS) that the base station is transmitting may change on a burst basis or between bursts, the UE may apply an average operation for RS reception power measurement, interference measurement and CSI measurement, based on the RSs received within the same burst. Also, the UE may apply an interpolation operation for data demodulation based on the RSs received within the same burst.

Belonging to the same burst may have the same meaning as assuming that the signals detected by the UE are transmitted at the same power.

The UE may determine whether the subframes belong to the same burst as follows.

First, UE detects the initial signal, a signal transmitted at least in the first subframe for each burst, a specific signal (for example, CRS transmitted in four OFDM symbols) such as a signal indicating the first subframe. It may be assumed that the signal received between the detected first and second signals belongs to the burst to which the first signal as detected first belongs. If the spacing between the first and second signals is greater than the specific spacing (e.g., maximum burst length), UE may assume that a signal received after the specific spacing from the first signal does not belong to the burst to which the first signal belongs. The first subframe may not include a partial subframe.

Second, UE detects a signal transmitted at least in the last subframe for each burst, a specific signal (for example, CRS transmitted in four OFDM symbols) such as a signal indicating the last subframe. It may be assumed that the signal received between the detected first and second signals belongs to the burst to which the second signal as detected later belongs. If the spacing between the first and second signals is greater than the specific spacing (e.g., maximum burst length), UE may assume that a signal received before the specific spacing from the second signal does not belong to the burst to which the second signal belongs. The last subframe may not include a partial subframe.

Third, sequence information indicating burst sequence may be transmitted every burst. The sequence information may include a sequence number (SN). The UE may assume that the subframes used to receive the same sequence value belong to the same burst. The UE may assume that the subframes used to receive the same sequence value within certain spacing (for example, within the maximum burst length) belong to the same burst. The UE may assume that the subframes used to receive different sequence values belong to different bursts. The UE may assume that a subframe between subframes used to receive different sequence values may be assumed to belong to the burst to which the subframe used to transmit the previous sequence value belongs. The sequence information may be 1-bit information.

Even if the transmission powers of the RSs are configured identically within the same burst, the UE may assume that certain signals may be transmitted at different transmission powers even within the burst containing the signals, wherein the signals such as DRS are advantageously transmitted at the same transmission power for a long time for RRM measurement. In addition, the UE may assume that signals used for synchronization, such as PSS/SSS or CRS port 0, are always transmitted at the same power, regardless of burst transmission power.

The time period during which the UE should perfoim RRM measurement or measure CSI may be provided using RRC signaling. The UE may assume that the transmission powers of the RSs used for the measurement is the same within the time period. The base station may provide to the UE, information related to the transmission power of the RS used for the CSI measurement or RRM measurement.

Figure 7:
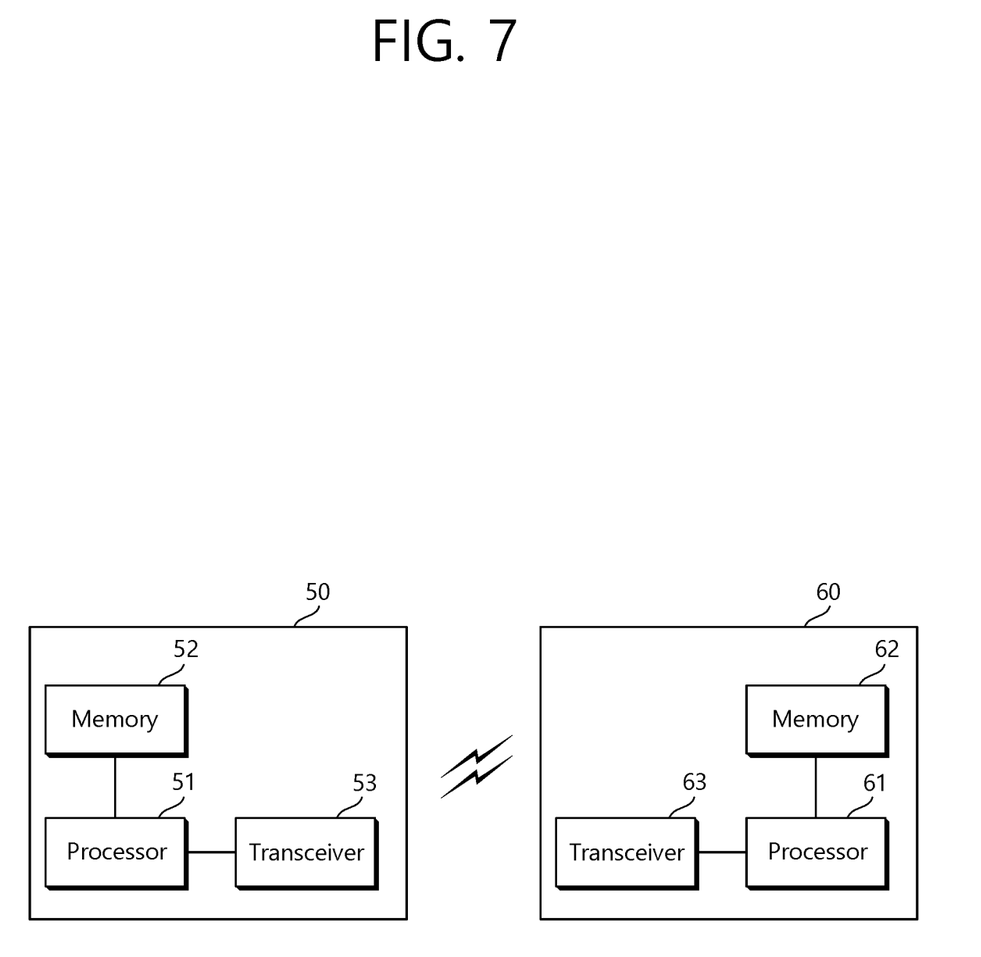
FIG. 7 is a block diagram illustrating a wireless communication system in which an embodiment of the present invention is implemented.

FIG. 7 is a block diagram illustrating a wireless communication system in which an embodiment of the present invention is implemented.

A wireless device 50 includes a processor 51, a memory 52 and a transceiver 53. The memory 52 is coupled to the processor 51 and stores various instructions executed by the processor 51. The transmitter/receiver 53 is connected to the processor 51 to transmit and/or receive a radio signal. The processor 51 implements the proposed functions, procedures and/or methods. In the above-described embodiment, the operation of the UE may be implemented by the processor 51. When the above-described embodiments are implemented in software instructions, the instructions are stored in memory 52, and are executed by the processor. In this way, the above-described operation may be performed by the processor 51.

A base station 60 includes a processor 61, a memory 62, and a transmitter/receiver 63. The base station 60 may operate in an unlicensed band. The memory 62 is coupled to the processor 61 and stores various instructions executed by the processor 61. The transmitter and receiver 63 is connected to the processor 61 to transmit and/or receive a radio signal. The processor 61 implements the proposed functions, procedures and/or methods. In the above-described embodiment, the operation of the base station may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for discontinuous reception (DRX) in an unlicensed band, the method comprising:
   attempting, by a wireless device, to acquire a downlink synchronization during a synchronization period after transitioning from a sleep state to an active state;
   when the downlink synchronization is not acquired during the synchronization period, receiving, by the wireless device, downlink data in the unlicensed band assuming that a modulation order of the downlink data scheduled in the active state is less than or equal to a specific value; and
   when the modulation order of the downlink data indicated by downlink control information is greater than the specific value, discarding, by the wireless device, the reception of the downlink data,
   wherein the wireless device further assumes that a physical downlink shared channel (PDSCH) to which a modulation order of 4 or higher is applied is not scheduled.

2. The method of claim 1, wherein the receiving the downlink data comprises:
   receiving, by the wireless device, the downlink control information for scheduling the downlink data by monitoring a downlink control channel in the active state.

3. The method of claim 1, wherein the specific value is three.

4. The method of claim 1, wherein the attempting to acquire the downlink synchronization includes receiving a discovery reference signal (DRS) during a discovery measurement timing configuration (DMTC).

5. A device for performing discontinuous reception (DRX) in an unlicensed band, the device comprising:
   a transceiver configured to transmit and receive a radio signal; and
   a processor coupled to the transceiver and configured to:
   attempt to acquire a downlink synchronization during a synchronization period after transitioning from a sleep state to an active state;
   when the downlink synchronization is not acquired during the synchronization period, receive downlink data in the unlicensed band assuming that a modulation order of the downlink data scheduled in the active state is less than or equal to a specific value; and
   when the modulation order of the downlink data indicated by downlink control information is greater than the specific value, discard the reception of the downlink data,
   wherein a physical downlink shared channel (PDSCH) to which a modulation order of 4 or higher is applied is not scheduled.

6. The device of claim 5, wherein the processor is configured to receive the downlink data by receiving the downlink control information for scheduling the downlink data by monitoring a downlink control channel in the active state.

* * * * *